United States Patent [19]
Miller et al.

[11] Patent Number: 5,933,491
[45] Date of Patent: Aug. 3, 1999

[54] SWITCHED INTEGRATED NETWORK ACCESS SYSTEM

[75] Inventors: James H. Miller, Randolph, N.J.; Robert C. Purkey, Scottsdale, Ariz.

[73] Assignee: Lucent Technologies Inc., Murray Hill, N.J.

[21] Appl. No.: 08/886,828

[22] Filed: Jul. 1, 1997

[51] Int. Cl.$^6$ ............................ H04M 7/00; H04M 11/04; H04M 3/42; H04M 3/00

[52] U.S. Cl. ............................ 379/229; 379/45; 379/207; 379/213; 379/221; 379/240; 379/258

[58] Field of Search ................................ 379/37, 45, 201, 379/207, 210, 211, 213, 219, 220, 221, 229, 240, 258

[56] References Cited

U.S. PATENT DOCUMENTS 5,249,223   9/1993   Vanacore .................................. 379/221

*Primary Examiner*—Harry S. Hong

[57] ABSTRACT

When it is determined, within a local exchange company (LEC) central office of a switched integrated network access (INA) network, that there are insufficient links to handle a terminating call to a competitive LEC (C-LEC) customer, the apparent status of the C-LEC customer is changed the LEC central office, such that, if the terminating call is received by the LEC central office from a C-LEC switch, the C-LEC customer will appear to the C-LEC switch to be unavailable to receive the terminating call, even though the C-LEC customer is in fact not off hook. The present invention avoids the prior-art inefficiencies associated with having time slots for C-LEC customers permanently nailed up by the LEC central office.

28 Claims, 2 Drawing Sheets ately uses those virtual channels. A permanently assigned

SWITCHED INTEGRATED NETWORK ACCESS SYSTEM

BACKGROUND OF THE INVENTION

1. Field of the Invention

The present invention relates to telecommunications, and, in particular, to network-based systems for providing local access to telephone customers.

2. Description of the Related Art

Under current U.S. law, a local exchange company (LEC) (e.g., Pacific Bell or Bell Atlantic) must provide local access connections for its current local-service customers (i.e., subscribers) who desire to become customers of a competitive LEC (C-LEC) (e.g., AT&T, MCI, as well as competitive access providers). That is, a LEC must be able to connect the loops of its current customers to the appropriate C-LEC switches.

Before 1980, most access loops to customers were copper pairs of wire contained in standard telephony cables. With simple copper access to customers, the connection of customers to C-LECs is a matter of connecting a customer's copper loop to the C-LEC's trunk facility which connects the LEC's office to the C-LEC's office. In the 1970s, the first electronic access loops were deployed by LECs as a cost-saving and service-improving alternative to copper. These systems account for about 20% of the access loops now found in the U.S., and up to 50% in certain LECs.

FIG. 1 shows a block diagram of part of the existing manner used for C-LEC interconnection using a conventional INA (integrated network access) network 100 conforming to existing standards used by the HFC2000™ Broadband Access System of Lucent Technologies, Incorporated, of Murray Hill, N.J. In network 100, central office 102 of a local exchange company provides access to the phones 104 of its local-access customers and C-LEC switches 106. Central office 102 comprises LEC switch 108, high-bandwidth access resource manager (HBARM) 110, and radio frequency (RF) distribution shelf (RFDS) 112.

In particular, central office 102 electronically interconnects calls originating at the phones 104 of the local-service customers, as well as calls terminating at those phones. An originating call is transmitted from user phone 104 to central office 102 via network interface unit (NIU) 114 and fiber node 116. Central office 102 transmits the originating call to the appropriate C-LEC switch 106 via one of a plurality of DS1 transmission links 118, where each transmission link 118 is, for example, a 24-line multiplexed T1 connection. Similarly, a terminating call is received by central office 102 from a C-LEC switch 106 via a transmission link 118 and then transmitted by central office 102 to the appropriate user phone 104 via fiber node 116 and NIU 114.

With electronic access systems, such as that in FIG. 1, each LEC central office is capable of handling a finite number of calls at the same time (i.e., the call-switching capacity of the LEC). This number, which includes both local-service calls between the LEC's customers as well as calls to or from customers for which the LEC is supplying the loop facility and a C-LEC is supplying local switching, is a function of the amount of hardware in the central office. In order to be cost-efficient, this number is typically less than the total number of local-service customers of the LEC. That is, the number of phones 104 in network 100 of FIG. 1 is greater than the number of calls that can be handled by central office 102 at any one time.

In order to provide access to a competitive LEC, a LEC typically permanently assigns a subset of its available access capacity to the C-LEC (i.e., nails up a fixed number of virtual channels called DS0 time slots) and charges the C-LEC rent accordingly, independent of how the C-LEC actually uses those virtual channels. A permanently assigned virtual channel is represented in FIG. 1 as a broken line from phone 104 to the appropriate transmission link 118. These virtual channels are permanently assigned to a C-LEC and are therefore always available. As such, the C-LEC's customers are always guaranteed of being successfully switched by the LEC's central office. By the same token, because a large number of the LEC's virtual channels may be permanently assigned to the C-LECs, the likelihood that the LEC's own customers will have trouble placing local-service calls may be greatly increased. As a result, the CLECs' customers may actually get better service from the LEC's central office than the LEC's own customers.

A LEC can solve this problem by purchasing more and more hardware for its central office, but this can be prohibitively expensive. It can also be terribly inefficient, especially since many of the virtual channels that are permanently assigned to the C-LECs may typically be unused at any given time.

SUMMARY OF THE INVENTION

The present invention is directed to the processing of telephone calls in a switched integrated network access (INA) network. According to embodiments of the invention, when it is determined within a local exchange company (LEC) central office of the network that there are insufficient links to handle a terminating call to a competitive LEC (C-LEC) customer, the apparent status of the C-LEC customer is changed within the LEC central office, such that, if the terminating call is received by the LEC central office from a C-LEC switch, the C-LEC customer will appear to the C-LEC switch to be unavailable to receive the terminating call, even though the C-LEC customer is in fact not off hook.

The present invention allows electronic loops, in general, and the Lucent BFC2000™ system, in particular, to provide the same level of service to both LEC and C-LEC customers, as currently mandated by U.S. law.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
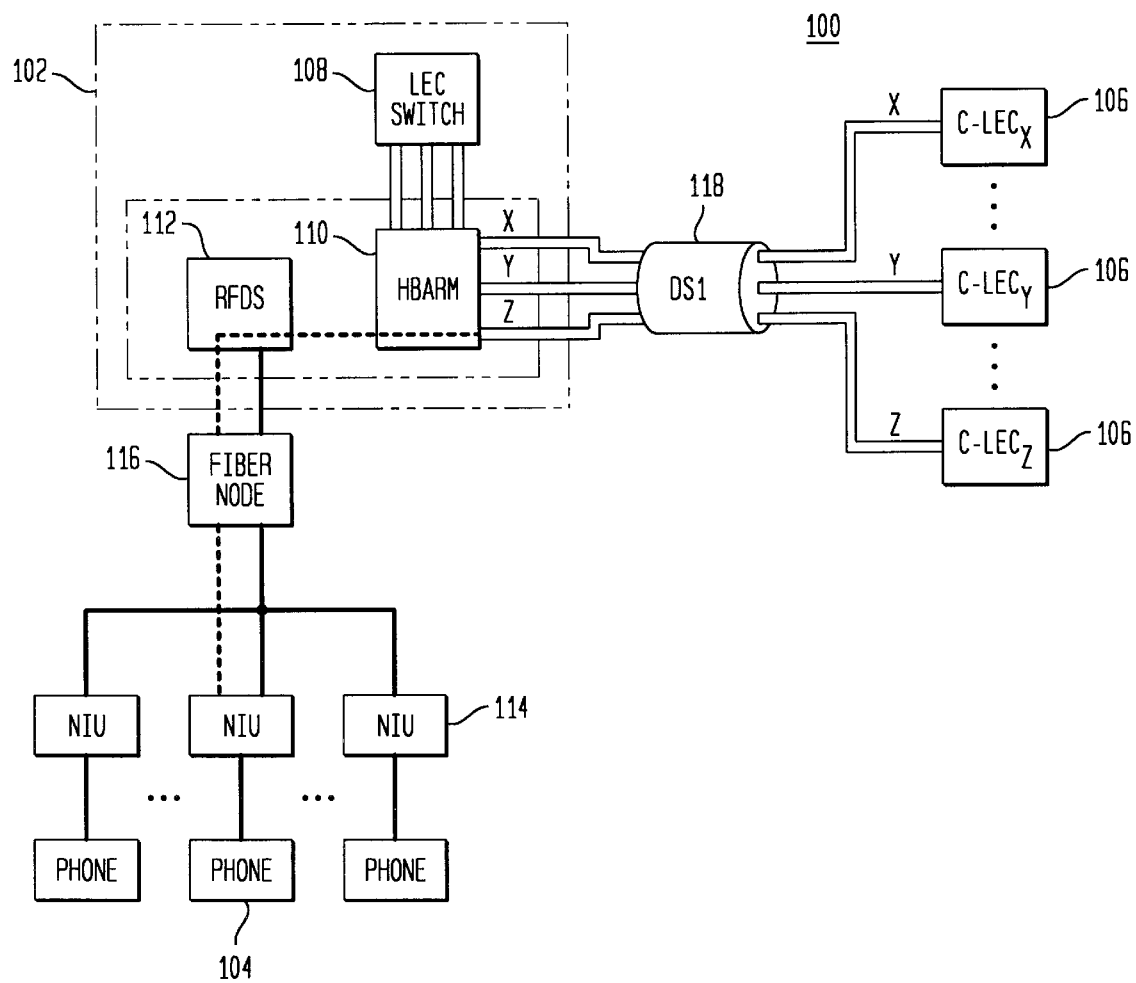
FIG. 1 shows a block diagram of part of the existing manner used for C-LEC interconnection using a conventional INA network conforming to existing standards used by the Lucent HFC2000™ Broadband Access System.
Figure 2:
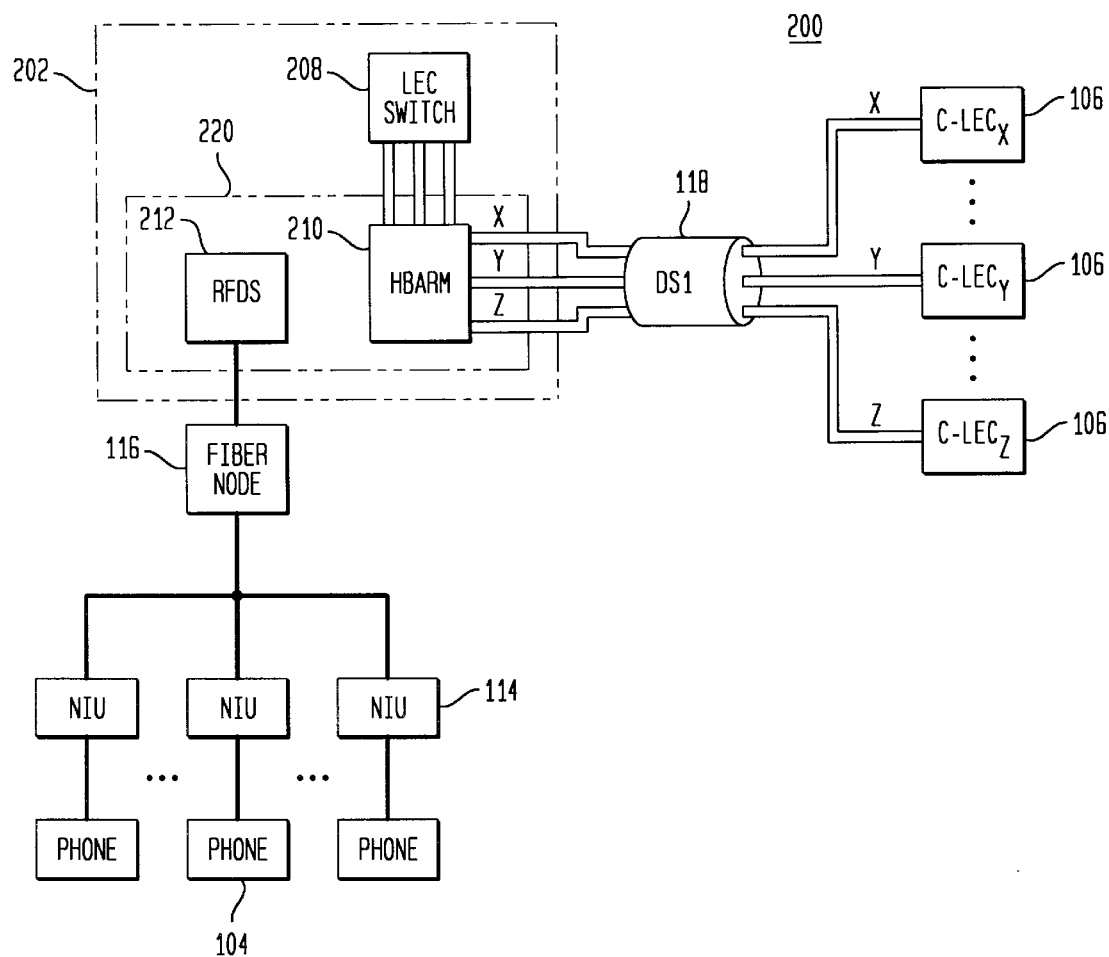
FIG. 2 shows a block diagram of part of a switched INA network, according to one embodiment of the present invention.

FIG. 2 shows a block diagram of part of a switched INA network 200, according to one embodiment of the present invention. Like network 100 of FIG. 1, network 200 conforms to the existing standards used by the HFC2000™ Broadband Access System of Lucent Technologies, Incorporated, of Murray Hill, N.J. At a high level, network 200 operates analogously to network 100. That is, in network 200, central office 202 of a local exchange company provides access between the phones 104 of its local-access customers and the corresponding C-LEC switches 106. Central office 202 comprises LEC switch 208 and host digital terminal (HDT) 220, where HDT 220 comprises high-bandwidth access resource manager 210 and radio frequency distribution shelf 212.

In particular, central office 202 processes calls originating at the phones 104 of its local-service customers, as well as those calls terminating at those phones. An originating call is transmitted from user phone 104 to central office 202 via network interface unit 114 and fiber node 116. Central office 202 transmits the originating call to the appropriate C-LEC switch 106 via one of a plurality of DS1 transmission links 118, where each transmission link 118 is, for example, a 24-line multiplexed T1 connection. Similarly, a terminating call is received by central office 202 from a C-LEC switch 106 via a transmission link 118 and then transmitted by central office 202 to the appropriate user phone 104 via fiber node 116 and NIU 114.

There are, however, significant differences between central office 202 of network 200 and central office 102 of a conventional INA network. According to the present invention, a C-LEC subscriber within network 200 would be provided service similar to that provided to a subscriber on a conventional INA network such as network 100, except that no DSO time slot for the C-LEC end customer would be nailed up through the RF distribution network (i.e., fiber node 116, RFDS 112, and HBARM 110), unless there is a call for that customer. As with conventional networks, the DS1 interface to the C-LEC switch (in an integrated configuration) or a LEC-owned channel bank (in a non-integrated configuration) would use the standard PUB43801 specification format for digital channel banks. There is one T0 time slot dedicated to each C-LEC subscriber on the PUB43801-formatted DS1 link or links to the C-LEC local switch. The following two subsections describe the call processing actions that are performed in the HDT for originating and terminating telephone calls, respectively. In addition to telephone calls, there are other circumstances for which a path through the RF distribution network needs to be set up.

Originating Call Processing

For calls originating on the HFC-2000™ system, the process of searching for and setting up of a path through the RF distribution network would proceed similarly to the way it would be done for subscribers accessing the LEC switch. The main difference in call processing between LEC and C-LEC customers is that, for C-LEC customers, the C-LEC switch (integrated configuration) or LEC-owned channel bank (non-integrated configuration) would be informed of an originating call by an on-hook to off-hook transition in the "A" signaling bit, while, for LEC customers, a message conforming to the Bellcore TR-303 standard is sent to inform the LEC switch of the originating call. As with TR-303, if no path through the RF network were currently available, the subscriber would receive no dial tone (unless a path through the RF network became available prior to the subscriber abandoning the call).

Terminating Call Processing

Terminating calls to a C-LEC subscriber on a switched INA virtual bank would be detected by the HDT from the receipt of a ringing bit pattern in the A/B signaling bits. In order to have a path set up in time for CLASS caller ID (i.e., where the called party sees the phone number of calling party), the HDT must do the ringing bit pattern detection and RF path setup within the 400-ms minimum duration of a ringing burst. (This timing constraint is specified in Section 5.1.13 of the Bellcore TR-57 Standard document.)

Blocking of a terminating call in the distribution network of an HFC-2000™ System can occur without this blocking being known a priori by the local switching system handling the terminating call. In other words, the local switch does not know that it will be blocked before it tries to complete the call.

Unlike TR-303, there is no mechanism available with switched INA virtual banks to signal the C-LEC switch to reject a call because of blocking in the RF distribution network. However, an alternative approach is possible. The scenario would operate as follows: Whenever all time slots on all receivers assigned to a coax run have been used, the HDT makes all idle C-LEC lines on that coax run busy (trunk processing). Similarly, whenever all time slots on all transmitters assigned to a fiber node have been used, the HDT makes all idle C-LEC lines on that fiber node busy (trunk processing). When the blocking condition no longer exists, the lines would be automatically put back in service (i.e., made non-busy). Traffic blocking reports would need to be updated with this additional information. In addition, there are certain local constraints (e.g., other calls already in existence) that will prevent a distribution time slot from being assigned. This condition can not be easily predetermined and will result in blocking. In these cases, the HDT will go off-hook to trip ringing and then go back on hook within 2 seconds to avoid billing. In this case, the calling party will hear a possible brief audible ringing followed by silence.

During the first 2.5 minutes of trunk processing, the line will produce a busy signal to a calling party. After this time, depending on how the local switch is configured, the local switch will route the call to either a trouble announcement or a reorder tone. In order to come as close as possible to meeting the recommended approach in TR-57, the local switch should be set up to send reorder tone. This alternative approach is based on the assumption that RF blocking is a rare event, and the exposure to signaling other than the reorder tone is only in this 2.5-minute period prior to the reorder tone being provided.

In summary, a broadband access system with the switched INA feature of the present invention "looks ahead" determining when the last resource is used and then "trunk processes" (busy-out) the lines at the C-LEC switch. The system recognizes when blockage is no longer an issue and releases the "trunk-processing" so that normal activity can take place. During the 2.5-minute period that it takes for trunk processing to produce (with a suitably configured switch) a reorder tone after blocking is recognized, the calling customer receives a busy signal instead of a reorder tone.

Range of Applicability

Assuming that a LEC/C-LEC interface specification that makes switched INA virtual banks technically feasible is agreed upon, switched INA virtual banks would be applicable to the same sort of situations where conventional INA virtual banks can be used, that is, serving C-LECs with low to moderate numbers of telephony circuits on an HBARM. An economic study would determine the maximum and minimum numbers of C-LEC end-customers for which a switched INA virtual bank provides the most economical solution.

The switched INA network of the present invention provides certain advantages. In particular, C-LEC subscribers are provided with the same access distribution blocking characteristics as are provided to LEC subscribers. In addition, NIU power dissipation will no longer increase (as it would if C-LEC subscribers were to be served from conventional INA virtual banks), since the NIU can be powered-down for inactive circuits. Note that nailed-up virtual channels (conventional INA) require full power even when not in use.

In order to implement a switched INA network of the present invention, the software to implement the above treatment of an in-coming call blocked in the distribution is implemented in the HDT, as described in the previous section.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method for processing telephone calls in a switched integrated network access (INA) network, comprising the steps of:
   (a) determining within a local exchange company (LEC) central office of the network that there are insufficient links to handle a terminating call to a competitive LEC (C-LEC) customer; and
   (b) changing within the LEC central office the apparent status of the C-LEC customer, such that, if the terminating call is received by the LEC central office from a C-LEC switch, the C-LEC customer will appear to the C-LEC switch to be unavailable to receive the terminating call, even though the C-LEC customer is in fact not off hook.

2. The invention of claim 1, wherein the network conforms to standards used by an HFC2000™ Broadband Access System of Lucent Technologies, Incorporated, of Murray Hill, N.J.

3. The invention of claim 1, wherein a DS0 time slot is nailed up for the C-LEC customer only if there is a terminating call to or an originating call from the C-LEC customer.

4. The invention of claim 1, wherein a DS1 interface to either the C-LEC switch or a LEC-owned channel bank conforms to standard PUB43801 specification format for digital channel banks.

5. The invention of claim 4, wherein one T0 time slot is dedicated to each C-LEC customer on the PUB43801-formatted DS1 interface to the C-LEC switch.

6. The invention of claim 1, wherein the C-LEC switch or a LEC-owned channel bank is informed of an originating call from a C-LEC customer by an on-hook to off-hook transition in an "A" signaling bit.

7. The invention of claim 6, wherein, if no path through the network is currently available, then the C-LEC customer receives no dial tone, unless a path through the network becomes available prior to the C-LEC customer abandoning the originating call.

8. The invention of claim 1, wherein the terminating call to the C-LEC customer is detected by the LEC central office from receipt of a ringing bit pattern in A/B signaling bits.

9. The invention of claim 1, wherein, in order to have a path set up in time for CLASS caller ID, the LEC central office performs ringing bit pattern detection and RF path setup within a 400-ms minimum duration of a ringing burst.

10. The invention of claim 1, wherein, whenever a blocking condition occurs wherein all time slots on all receivers assigned to a coax run have been used or wherein all time slots on all transmitters assigned to a fiber node have been used, the LEC central office makes all idle C-LEC lines on the coax run busy.

11. The invention of claim 10, wherein, when the blocking condition no longer exists, the busied C-LEC lines are automatically made non-busy.

12. The invention of claim 1, wherein, whenever a blocking condition occurs due to other calls being carried by the network that will prevent a distribution time slot from being assigned, the LEC central office goes off-hook to trip ringing and then goes back on hook within 2 seconds to avoid billing.

13. The invention of claim 1, wherein software to handle the terminating call blocked in distribution is implemented in the LEC central office.

14. The invention of claim 1, wherein:
   a DS0 time slot is nailed up for the C-LEC customer only if there is a terminating call to or an originating call from the C-LEC customer;
   a DS1 interface to either the C-LEC switch or a LEC-owned channel bank conforms to standard PUB43801 specification format for digital channel banks;
   one T0 time slot is dedicated to each C-LEC customer on the PUB43801-formatted DS1 interface to the C-LEC switch;
   the C-LEC switch or a LEC-owned channel bank is informed of an originating call from a C-LEC customer by an on-hook to off-hook transition in an "A" signaling bit;
   if no path through the network is currently available, then the C-LEC customer receives no dial tone, unless a path through the network becomes available prior to the C-LEC customer abandoning the originating call;
   the terminating call to the C-LEC customer is detected by the LEC central office from receipt of a ringing bit pattern in A/B signaling bits;
   in order to have a path set up in time for CLASS caller ID, the LEC central office performs ringing bit pattern detection and RF path setup within a 400-ms minimum duration of a ringing burst;
   whenever a blocking condition occurs wherein all time slots on all receivers assigned to a coax run have been used or wherein all time slots on all transmitters assigned to a fiber node have been used, the LEC central office makes all idle C-LEC lines on the coax run busy;
   when the blocking condition no longer exists, the busied C-LEC lines are automatically made non-busy;
   whenever a blocking condition occurs due to other calls being carried by the network that will prevent a distribution time slot from being assigned, the LEC central office goes off-hook to trip ringing and then goes back on hook within 2 seconds to avoid billing;
   software to handle the terminating call blocked in distribution is implemented in the LEC central office;
   blocking of a terminating call in the network occurs without the blocking being known a priori by a local switching system handling the terminating call; and
   during a period that it takes for trunk processing to produce a reorder tone after blocking is recognized, a calling customer receives a busy signal.

15. An apparatus for processing telephone calls in a switched integrated network access (INA) network, comprising the steps of:
   (a) means for determining within a local exchange company (LEC) central office of the network that there are insufficient links to handle a terminating call to a competitive LEC (C-LEC) customer; and (b) means for changing within the LEC central office the apparent status of the C-LEC customer, such that, if the terminating call is received by the LEC central office from a C-LEC switch, the C-LEC customer will appear to the C-LEC switch to be unavailable to receive the terminating call, even though the C-LEC customer is in fact not off hook.

16. The invention of claim 15, wherein the network conforms to standards used by an HFC2000™ Broadband Access System of Lucent Technologies, Incorporated, of Murray Hill, N.J.

17. The invention of claim 15, wherein a DS0 time slot is nailed up for the C-LEC customer only if there is a terminating call to or an originating call from the C-LEC customer.

18. The invention of claim 15, wherein a DS1 interface to either the C-LEC switch or a LEC-owned channel bank conforms to standard PUB43801 specification format for digital channel banks.

19. The invention of claim 18, wherein one T0 time slot is dedicated to each C-LEC customer on the PUB43801-formatted DS1 interface to the C-LEC switch.

20. The invention of claim 15, wherein the C-LEC switch or a LEC-owned channel bank is informed of an originating call from a C-LEC customer by an on-hook to off-hook transition in an "A" signaling bit.

21. The invention of claim 20, wherein, if no path through the network is currently available, then the C-LEC customer receives no dial tone, unless a path through the network becomes available prior to the C-LEC customer abandoning the originating call.

22. The invention of claim 15, wherein the terminating call to the C-LEC customer is detected by the LEC central office from receipt of a ringing bit pattern in A/B signaling bits.

23. The invention of claim 15, wherein, in order to have a path set up in time for CLASS caller ID, the LEC central office performs ringing bit pattern detection and RF path setup within a 400-ms minimum duration of a ringing burst.

24. The invention of claim 15, wherein, whenever a blocking condition occurs wherein all time slots on all receivers assigned to a coax run have been used or wherein all time slots on all transmitters assigned to a fiber node have been used, the LEC central office makes all idle C-LEC lines on the coax run busy.

25. The invention of claim 24, wherein, when the blocking condition no longer exists, the busied C-LEC lines are automatically made non-busy.

26. The invention of claim 15, wherein, whenever a blocking condition occurs due to other calls being carried by the network that will prevent a distribution time slot from being assigned, the LEC central office goes off-hook to trip ringing and then goes back on hook within 2 seconds to avoid billing.

27. The invention of claim 15, wherein software to handle the terminating call blocked in distribution is implemented in the LEC central office.

28. The invention of claim 15, wherein:

a DS0 time slot is nailed up for the C-LEC customer only if there is a terminating call to or an originating call from the C-LEC customer;

a DS1 interface to either the C-LEC switch or a LEC-owned channel bank conforms to standard PUB43801 specification format for digital channel banks;

one T0 time slot is dedicated to each C-LEC customer on the PUB43801-formatted DS1 interface to the C-LEC switch;

the C-LEC switch or a LEC-owned channel bank is informed of an originating call from a C-LEC customer by an on-hook to off-hook transition in an "A" signaling bit;

if no path through the network is currently available, then the C-LEC customer receives no dial tone, unless a path through the network becomes available prior to the C-LEC customer abandoning the originating call;

the terminating call to the C-LEC customer is detected by the LEC central office from receipt of a ringing bit pattern in A/B signaling bits;

in order to have a path set up in time for CLASS caller ID, the LEC central office performs ringing bit pattern detection and RF path setup within a 400-ms minimum duration of a ringing burst;

whenever a blocking condition occurs wherein all time slots on all receivers assigned to a coax run have been used or wherein all time slots on all transmitters assigned to a fiber node have been used, the LEC central office makes all idle C-LEC lines on the coax run busy;

when the blocking condition no longer exists, the busied C-LEC lines are automatically made non-busy;

whenever a blocking condition occurs due to other calls being carried by the network that will prevent a distribution time slot from being assigned, the LEC central office goes off-hook to trip ringing and then goes back on hook within 2 seconds to avoid billing;

software to handle the terminating call blocked in distribution is implemented in the LEC central office;

blocking of a terminating call in the network occurs without the blocking being known a priori by a local switching system handling the terminating call; and during a period that it takes for trunk processing to produce a reorder tone after blocking is recognized, a calling customer receives a busy signal.

* * * * *